INVENTOR
Joseph D. Embler.
BY Roy A. Plant
ATTORNEY

United States Patent Office 2,849,135
Patented Aug. 26, 1958

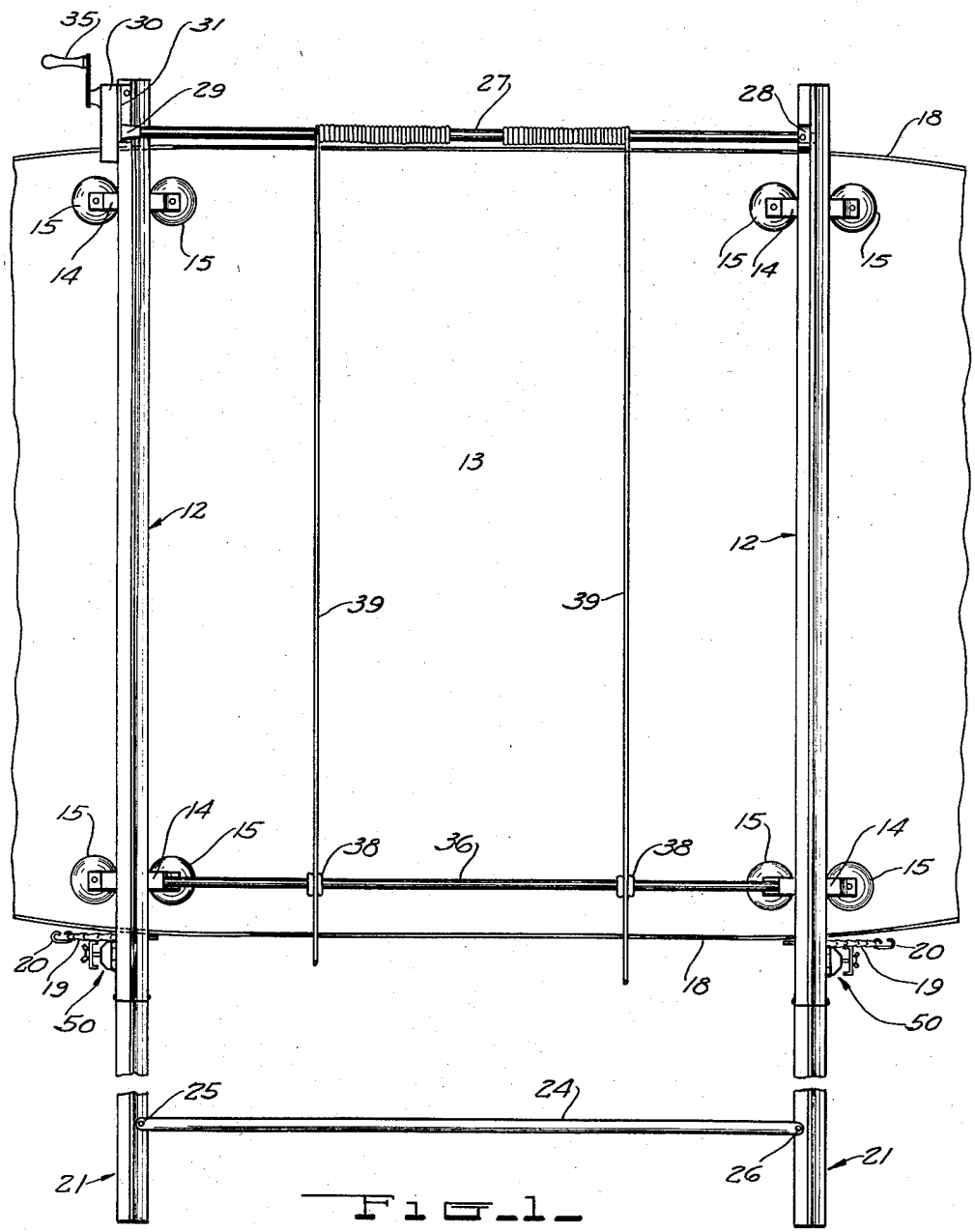

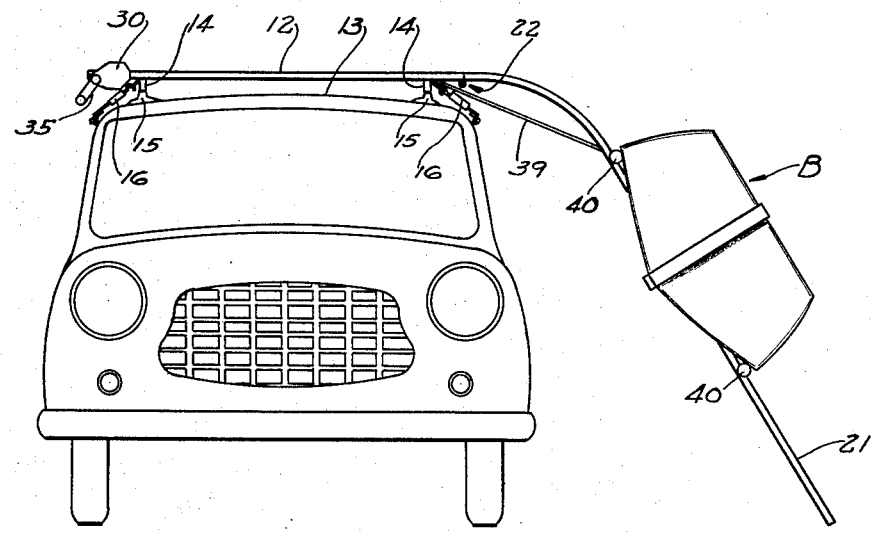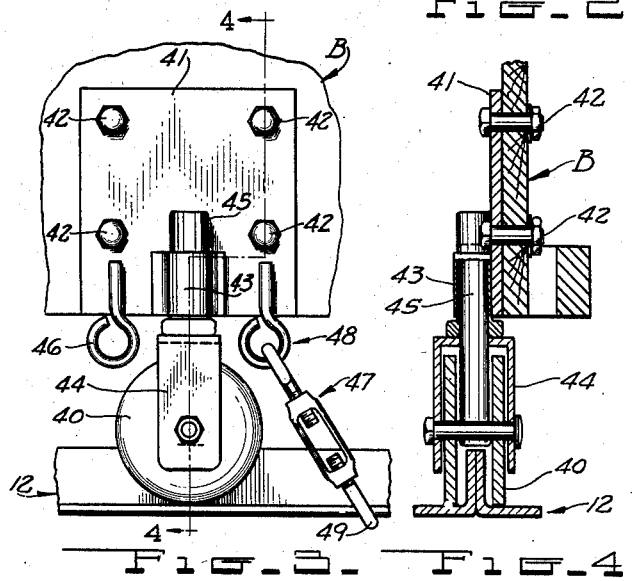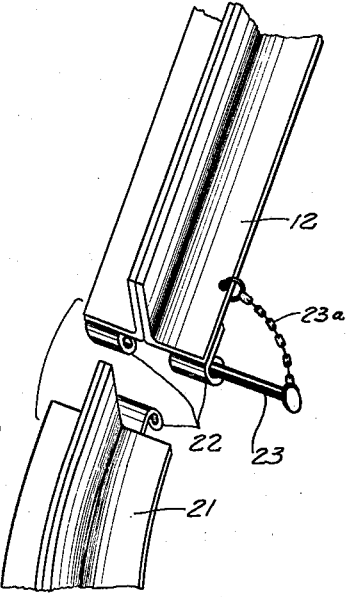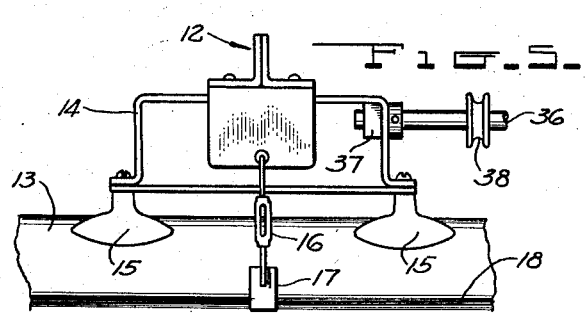
INVENTOR
Joseph D. Embler
BY Roy A. Plant
ATTORNEY Aug. 26, 1958 J. D. EMBLER 2,849,135
SIDE LOADING AUTOMOBILE TOP CARRIER
Filed Jan. 20, 1956 3 Sheets-Sheet 3

2,849,135

SIDE LOADING AUTOMOBILE TOP CARRIER

Joseph D. Embler, Sturgis, Mich.

Application January 20, 1956, Serial No. 560,422

7 Claims. (Cl. 214—450)

The present invention relates broadly to loading and transporting equipment, and in its specific phases this invention is designed to provide a new and improved means for easily loading a boat onto the top of an automobile as well as for transporting same to and from the water, and also for unloading the boat with equal ease.

Two current practices are used to transport row boats or the like to distant fishing points, aside from commercial trucking, and one of these consists of using a boat trailer, and the other carrying the boat on the roof of an automobile. The greatest difficulty of the latter is loading or unloading the boat onto or from the automobile roof. The equipment which has been proposed and used for this purpose has generally been clumsy and unsightly, and invariably has required two or more persons to handle the boat during the loading and unloading of same. It was a recognition of these problems and the inherent difficulties encountered with the prior equipment and procedures for transporting a boat on an automobile rooftop which led to the conception and development of the present invention.

Accordingly among the objects of the present invention is the provision of an improved boat loading and transporting apparatus which has two horizontal rails mounted transversely on the automobile top, two detachable rails provided to incline from the ground to one end of said horizontal rails, a winch mounted on the other end of said horizontal rails, rollers mounted on the boat to travel upon the rails, and pull lines connected with said winch and adapted for connection with the boat, to pull it up the inclined rails and onto the horizontal rails. The boat is then solidly fastened to the horizontal rails and the inclined rails are detached and clamped to the horizontal rails in a position in which they extend longitudinally of the automobile at one side of the boat. Safe transportation of the boat is then possible and when the destination is reached, the same equipment is easily used to unload the boat.

Another object of the invention is to provide novel means for mounting the rollers on the boat, connecting the pull lines with the boat, and connecting turnbuckles with said boat for use in anchoring the roller-supported boat on the horizontal car-carried rails.

Another object of the invention is to provide a special winch assembly for handling a boat or the like on the loading and transporting assembly.

A further object is to provide novel clamping means for clamping the inclined rails to the horizontal rails when the former are detached and laid idly upon said horizontal rails.

Still further objects and advantages of the invention will appear as the description proceeds.

To the accomplishment of the foregoing and related ends, the invention, then, consists of the means hereinafter fully described and particularly pointed out in the claims, the annexed drawings and the following description setting forth in detail certain means for carrying out the invention, such disclosed means illustrating, however, but one of various ways in which the principle of the invention may be used.

In the annexed drawings:

Figure 1 is a top plan view showing the horizontal rails and associated elements mounted on the top of an automobile, and showing the inclined rails connected with said horizontal rails.

Figure 2 is a front elevation showing a boat being loaded or unloaded.

Figure 3 is a detail elevation, showing one of the rollers and the associated elements.

Figure 4 is a vertical sectional view on line 4—4 of Figure 3, looking in the direction of the arrows.

Figure 5 is an end elevation of one of the horizontal tracks showing the mounting and anchoring means therefor.

Figure 6 is a fragmentary perspective view showing the manner of detachably connecting the inclined and horizontal tracks.

Figure 7:
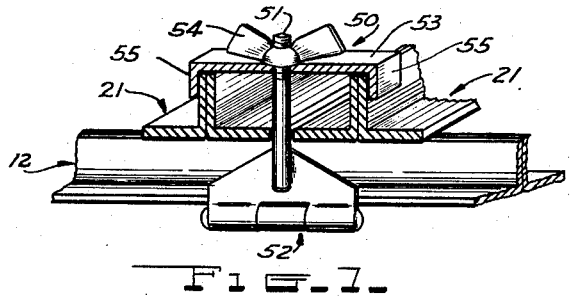
Figure 7 is a fragmentary sectional perspective view showing one of the clamps for securing the inclined rails upon the horizontal rails when the former are laid idly upon the latter for transportation.

Preferences as to the form and position of the loading and transporting members have been illustrated in the drawings, and for ease of understanding the invention they will be rather specifically described, but attention is invited to the possibility of making variations within the scope and spirit of the invention as thus set forth.

Two rails 12, Figure 1, are provided to extend transversely over the top 13 of an automobile, said rails having end frames 14 provided with suction cups 15 to engage said top 13. Each end of each rail 12 is provided with a turnbuckle 16, Figure 5, having a hook 17 to engage the usual drainage gutter 18 of the automobile. Also, brace chains 19, Figure 1, are provided for the rails 12 at one end of each, said brace chains having hooks 20 to engage an eye 48 on attaching plate 41 joined to the boat B.

Figure 10:
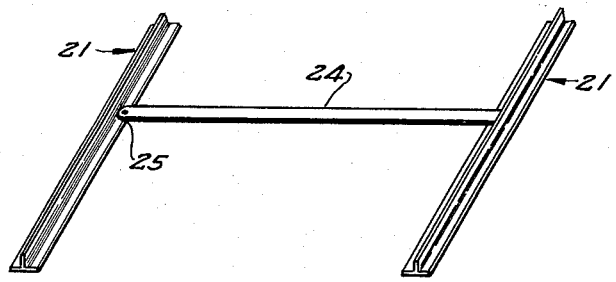
Figure 10 is a fragmentary perspective view showing the lower ends of the inclined rails, when they are of one piece T-section instead of back-to-back angles, and a removable spacing bar therefor.

Two additional rails 21 are provided to incline from the ground to one end of the horizontal rails 12, and the two sets of rails have coacting knuckles 22, Figure 6, to receive pins 23, which are preferably joined to rails 12 by means of chains 23a, thus permitting the inclined rails 21 to be detachably connected with the horizontal rails 12. The lower portions of the rails 21 are connected by a spacing bar 24, Figures 1 and 10, which is pivoted at 25 to one of said rails and is detachably bolted at 26 to the other of these rails.

Figures 8, 9:
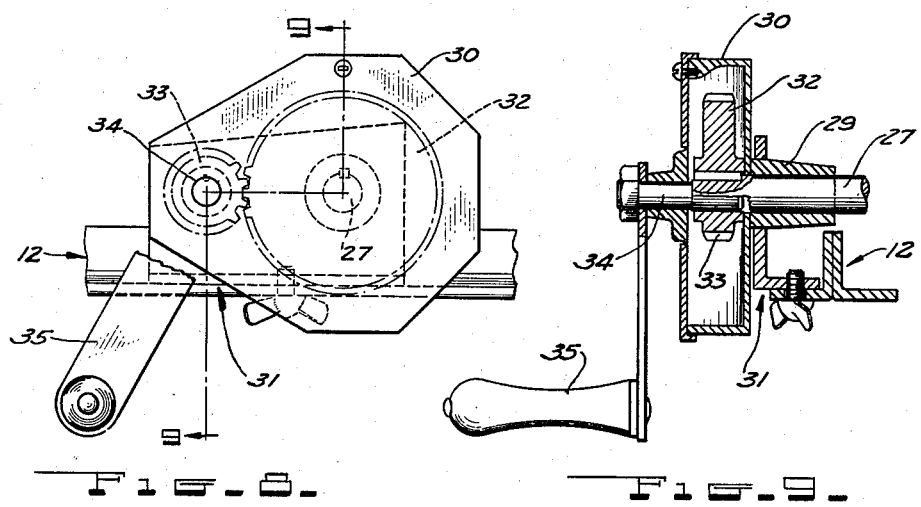
Figure 8 is a fragmentary elevation showing the driving means for the winch.
Figure 9 is a "jump section" on line 9—9 of Figure 8, looking in the direction of the arrows.

A winch shaft 27, Figures 1, 8, and 9, extends between the ends of the rails 12 remote from the rails 21. One of the rails 12 has a bearing 28 for one end of this winch shaft 27. The other end of this shaft extends through a bearing 29 on a gear casing 30 which is mounted at 31 on the other of the rails 12. A gear 32 is secured on the winch shaft 27, within the casing 30 and meshes therein with a drive pinion 33, the shaft 34 of said pinion 33 being provided with a hand crank 35. Rotation of this crank drives the gearing 32, 33 to rotate the winch shaft 27.

At the ends of the rails 12 toward the inclined rails 21, shaft 36, Figures 1 and 5, extends between the rail-supporting frames 14, said frames having bearings 37 in which said shaft 36, if desired, may be rotatably mounted. This shaft 36 has two grooved pulleys 38, which are preferably slidable endwise on shaft 36, and over which pass two pull lines 39, said lines 39 being connected to the winch shaft 27 which is also mounted on said rails 12.

Rollers 40, as best shown in Figures 2, 3, and 4, are provided for mounting on the sides of the boat B in positions to travel upon the rails 21 and 12 when the boat is inverted, and provision is made for connecting the pull lines 39 with said boat. Thus, when the pull lines are connected to the boat, and the rails 21 and boat are properly positioned, relatively, operation of the crank to wind the pull lines 39 on the winch shaft 27, will cause said lines to pull the boat upwardly along the inclined rails 21 and then horizontally onto the horizontal rails 12, the rollers 40 traveling on the two sets of rails during this boat loading operation. Operational reversal will of course permit easy unloading of the boat from the car.

Four attaching plates are provided for mounting the rollers 40 on the boat B, one of said plates being shown at 41 in Figures 3 and 4. Bolts 42 are employed to secure each plate 41 to the boat, and each plate has a vertical socket 43. The rollers 40 are mounted in forks, one of which is shown at 44 in Figures 3 and 4, and each fork has an upstanding stub 45 receivable removably in the socket 43.

At least two of the plates 41 have eyes for connecting the pull lines 39 thereto, one of said eyes being shown at 46 in Figure 3. Two of the plates 41 are also provided with a turnbuckle 47 pivotally connected thereto by means of an eye 48, and having a hook 49 for engaging a rail 12 at its end adjacent said winch. After the boat B is fully in position on the rails 12, hooks 20 on chains 19 are engaged with eyes 48 on two of the plates 41, and the hooks 49 supported by eyes 48 on the other two plates 41 are conventionally engaged with these rails, Figure 3, and the turnbuckles 47 are tightened, thereby tightening chains 19 and tightly anchoring the boat in carrying position on the car.

After the rails 21 have served their function during boat loading or unloading, said rails 21 are detached from the rails 12 and the tie bar 24 is detached from one of said rails 21 and swung to a position against the other of these rails. The two rails 21, Figure 7, with the tie bar between them, are then laid upon the end portions of the horizontal rails 12 remote from the winch shaft 27, and clamps 50 are provided to clamp said rails 21 in this idle position. Figure 1 shows the location of the clamps 50 and the clamp construction is illustrated in Figure 7, where a bolt 51 is hinged at 52 to the rail 12 to extend upwardly between the idle rails 21. A clamping plate 53 is provided on this bolt 51 to lie upon the rails 21, and a wing nut 54 is threaded on said bolt to move said plate to clamping position. The ends of the clamping plate 53 are turned down at 55 to prevent separation of the rails 21. When the rails 21 are to be again used, the clamps 50 are released and swung down out of the way as indicated in Figure 1.

From the foregoing, it will be seen that a novel and advantageous boat loading and transporting construction has been disclosed for attaining the desired ends, and while there is herein shown and described the preferred embodiment of the invention, it is nevertheless to be understood that minor changes may be made therein without departing from the spirit and scope of the invention as described.

Other modes of applying the principle of my invention may be employed instead of the one explained, change being made as regards the article and combinations herein disclosed, provided the means stated by any of the following claims or the equivalent of such stated means be employed.

I therefore particularly point out and distinctly claim as my invention:

1. In a means for loading a boat upon the top of an automobile, two rails and means for mounting them on the automobile top in spaced parallel relation and in positions extending transversely of the top, two additional rails to incline from the ground to one end of the first mentioned rails, a winch mounted on the other ends of said first mentioned rails, means for detachably connecting said additional rails with said first mentioned rails, track engaging rollers to travel up said additional rails and onto said first mentioned rails, means for mounting said rollers on front and rear portions of the boat to be loaded with the plane of said rollers extending in a direction transversely of the keel line of said boat, two pull lines connected with said winch, and means for connecting said pull lines with front and rear portions of the boat respectively, said means for mounting said rollers on the boat including plates for attachment to the boat, said means for connecting said pull lines with the boat including eyes secured to at least two of said plates.

2. In a means for loading a boat upon the top of an automobile, two rails and means for mounting them on the automobile top in spaced parallel relation and in positions extending transversely of the top, two additional rails to incline from the ground to one end of the first mentioned rails, a winch mounted on the other ends of said first mentioned rails, means for detachably connecting said additional rails with said first mentioned rails, track engaging rollers to travel up said additional rails and onto said first mentioned rails, means for mounting said rollers on front and rear portions of the boat to be loaded with the plane of said rollers extending in a direction transversely of the keel line of said boat, two pull lines connected with said winch, and means for connecting said pull lines with front and rear portions of the boat respectively, said means for mounting said rollers on the boat including plates for attachment to the boat, said means for connecting said pull lines with the boat including eyes secured to at least two of said plates; and turnbuckles connected with said plates and having hooks to engage the first mentioned rails to anchor the roller-supported boat on these rails.

3. In a means for loading a boat upon the top of an automobile, two rails and means for mounting them on the automobile top in spaced parallel relation and in positions extending transversely of the top, two additional rails to incline from the ground to one end of the first mentioned rails, a winch mounted on the other ends of said first mentioned rails, means for detachably connecting said additional rails with said first mentioned rails, track engaging rollers to travel up said additional rails and onto said first mentioned rails, means for mounting said rollers on front and rear portions of the boat to be loaded with the plane of said rollers extending in a direction transversely of the keel line of said boat, two pull lines connected with said winch, and means for connecting said pull lines with front and rear portions of the boat respectively, said rollers being mounted in forks having upstanding stubs, said means for mounting said rollers on the boat including plates for attachment to the boat, said plates having sockets to removably receive said stubs.

4. In a means for loading a boat upon the top of an automobile, two rails and means for mounting them on the automobile top in spaced parallel relation and in positions extending transversely of the top, two additional rails to incline from the ground to one end of the first mentioned rails, a winch mounted on the other ends of said first mentioned rails, means for detachably connecting said additional rails with said first mentioned rails, track engaging rollers to travel up said additional rails and onto said first mentioned rails, means for mounting said rollers on front and rear portions of the boat to be loaded with the plane of said rollers extending in a direction transversely of the keel line of said boat, two pull lines connected with said winch, and means for connecting said pull lines with front and rear portions of the boat respectively, said rollers being mounted in forks having upstanding stubs, said means for mounting said rollers on the boat including plates for attachment to the boat, said plates having sockets to receive said stubs, at least two of said plates having eyes to which to connect said pull lines, and turnbuckles connected with said plates, said turnbuckles having hooks to engage the first mentioned rails to anchor the roller-supported boat on these rails.

5. In a means for loading a boat upon the top of an automobile, two rails and means for mounting them on the top transversely thereof and in spaced parallel relation, two additional rails extending from the ground to one end of the first mentioned rails, winch means on said first mentioned rails for moving said boat up and down said rails, means for detachably connecting said additional rails to said first mentioned rails, rail guided rollers to travel along said first mentioned rails and said additional rails, means for mounting said rollers on front and rear portions of the boat to be loaded, pull line means extending from said boat to said winch means, said means for mounting said rollers on the boat including plates rigidly attached to the boat, said rollers being directly attached to said plates, and means on said plates for attaching a free end of the pull line means thereto.

6. In a means for loading a boat upon the top of an automobile, two rails and means for mounting them on the top transversely thereof and in spaced parallel relation, two additional rails extending from the ground to one end of the first mentioned rails, winch means on said first mentioned rails for moving said boat up and down said rails, means for detachably connecting said additional rails to said first mentioned rails, rail guided rollers to travel along said first mentioned rails and said additional rails, means for mounting said rollers on front and rear portions of the boat to be loaded, pull line means extending from said boat to said winch means, said means for mounting said rollers on the boat including plates for attachment to the boat, means on said plates for attaching the pull line means thereto, and rigid means pivotally attached to said plates for engagement with said first mentioned rails when the boat has been moved into loaded position to fix said boat and rollers strongly to the first mentioned rails.

7. In a means for loading a boat upon the top of an automobile, two rails and means for mounting them on the top transversely of the automobile and in spaced parallel relation, two additional rails inclining when loading from the ground to one end of the first mentioned rails, a winch mounted on the other ends of said first mentioned rails, means for detachably connecting said additional rails with said first mentioned rails, rollers for traveling up said additional rails and onto said first mentioned rails, means for mounting said rollers on front and rear portions of the boat to be loaded with the plane of said rollers extending in a direction transversely of the keel line of said boat, said winch including an elongated shaft extending between said first rails and journaled for rotation thereon, spaced winch cables having their inner ends secured to said shaft, each cable winding progressively along said shaft in a single layer as the boat is moved up said rails by said winch, and a second elongated shaft spaced from said first shaft also supported by said first mentioned rails and having spaced idler pulleys axially slidable and rotatable thereon forming guides for each of said winch cables.

References Cited in the file of this patent

UNITED STATES PATENTS

| 1,760,458 | Weber | May 27, 1930 |
| 2,198,270 | Maranville | Apr. 23, 1940 |
| 2,387,082 | Malling | Oct. 16, 1945 |
| 2,421,671 | West | June 3, 1947 |
| 2,551,351 | Swenson | May 1, 1951 |
| 2,715,974 | Van Nest | Aug. 23, 1955 |
| 2,722,326 | Conroy | Nov. 1, 1955 |

FOREIGN PATENTS

| 350,406 | Italy | July 12, 1937 |